United States Patent [19]

Baker

[11] Patent Number: 5,199,179
[45] Date of Patent: Apr. 6, 1993

[54] APPARATUS AND METHOD FOR MEASURING ANGLES BETWEEN ANGULARLY RELATED FLAT SURFACES

[76] Inventor: Stuart K. Baker, 3546 Seaway Dr., New Port Richey, Fla. 34652

[21] Appl. No.: 869,502

[22] Filed: Apr. 16, 1992

[51] Int. Cl.⁵ .................................................. B43L 7/00
[52] U.S. Cl. ...................................... 33/415; 33/481; 33/456
[58] Field of Search ............... 33/415, 456, 481, 471, 33/416, 417, 1 N, 529, 534, 403

[56] References Cited

U.S. PATENT DOCUMENTS

| | | | |
|---|---|---|---|
| 718,344 | 1/1903 | Hampton | 33/415 |
| 1,324,681 | 12/1919 | McDonald | 33/481 |

FOREIGN PATENT DOCUMENTS 183409 6/1966 U.S.S.R. .............................. 33/529

Primary Examiner—Harry N. Haroian
Attorney, Agent, or Firm—Nixon & Vanderhye

[57] ABSTRACT

The measuring tool includes a pair of measuring sections pivotally hinged one to the other. Each section includes a flat plate mounted for pivotal movement about an axis normal to the hinge axis. Frictional locking means lock each plate in adjusted pivotal positions about its axis. A frictional locking means also locks the pivoted sections one to the other in adjusted positions about the hinge axis. The plates contain measuring indicia and are slidable linearly in a direction parallel to the axis about which the plates are pivoted.

18 Claims, 3 Drawing Sheets

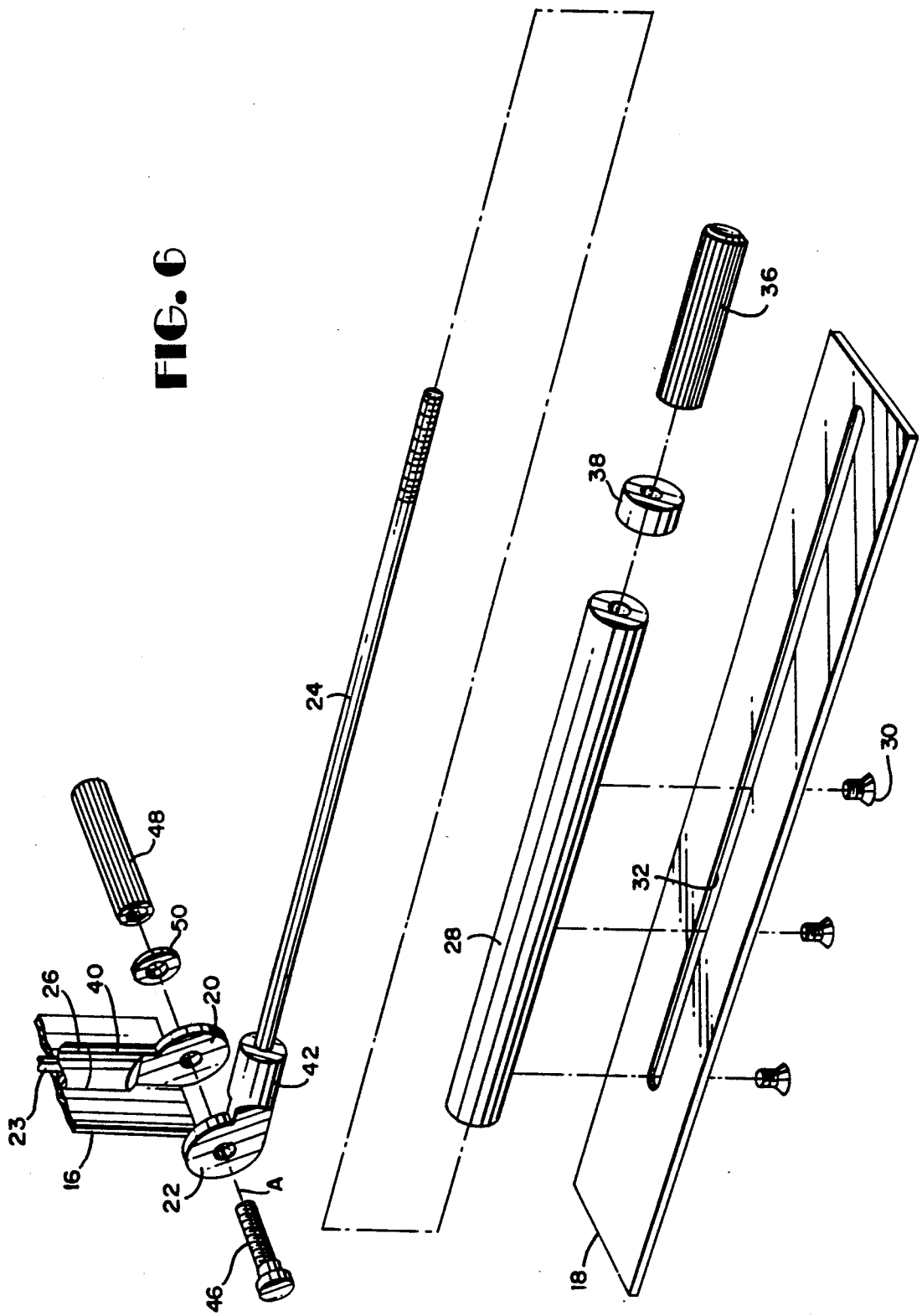

APPARATUS AND METHOD FOR MEASURING ANGLES BETWEEN ANGULARLY RELATED FLAT SURFACES

BACKGROUND AND SUMMARY OF THE INVENTION

The present invention is directed to a simple, economical and effective measuring tool for measuring multiple angles between flat angularly related surfaces and particularly relates to a measuring tool for transferring those angles to other surfaces whereby the tool becomes a template precisely corresponding to the measured angles.

As architects, draftsmen, carpenters and others have long known, there is a need for measuring angles in a three-dimensional sense. For example, where gabled roof lines meet, there is a need to be able to measure the angle between the two flat surfaces with reference to a datum, e.g., a true perpendicular or horizontal. The angle to be measured thus extends angularly to each of the horizontal and vertical and is therefore a three-dimensional angle relative to the datum. After measuring, there is the further need to transfer the angle to other work or use the instruments as a template, for example, to adjust a saw blade for making cuts at multiple angles.

In accordance with the present invention, there is provided a measuring tool for measuring angles between flat angularly related surfaces which are both angled relative to a horizontal or vertical datum surface. More particularly, the tool includes a pair of measuring sections which are hinged one to the other at mating ends for pivotal movement in a plane about the hinge axis. Each measuring section includes a flat plate which is mounted in that section for pivotal movement about an axis in the plane and normal to the hinge axis of the measuring sections. To mount the plate for pivotal movement about the normal axis in each measuring section, there is provided a rod which projects from a hinge element of that section and which lies coincident with the axis normal to the hinge axis. A sleeve is rotatably mounted about the rod and mounts the plate whereby the plate is pivotal about the rod. The plate is also locked in adjusted angular positions about the rod. To accomplish this, the end of the rod distal to the hinge element mounts a threaded locking element. By threading and unthreading the locking element relative to the rod, the sleeve is frictionally engaged and disengaged between the base of the hinge element and the locking element whereby the plate may be selectively locked and unlocked in selected adjusted angular positions about the normal axis.

Each hinge element includes a surface for mating with a corresponding hinge element surface of the other measuring section. A screw-threaded pin passes through openings in these mating hinge elements in forming the hinge axis. A knob threadedly engages the pin on the opposite side of the hinge elements whereby the hinge elements may be releasably locked one to the other, hence enabling the measuring sections to be locked in selected angular adjustment relative to one another about the hinge axis.

Additionally, the measuring tool hereof mounts each plate for linear sliding movement in a direction generally parallel to the normal axis about which the plate pivots. Thus, the plate is slidable into selected adjusted positions relative to the sleeve and may be locked in such positions. It will be appreciated that the plate includes measuring indicia, for example, in the English or metric systems, for measuring distances.

To use the measuring tool hereof, the locking knobs are loosened so that each plate is pivotally rotatable about the normal axis and each measuring section is freely pivotal about the hinge axis. The tool may then be placed against the flat surfaces to be measured, with the plates lying flush against such surfaces. The knobs are then tightened to lock the hinge elements one to the other and each plate to the corresponding hinge element. Thus, the angle is measured by the setting of the measuring tool in a three-dimensional sense. By locking the tool in this position, the tool may be removed from the measuring surfaces and transferred to work and the identical angle measured by the tool may be transcribed onto the work.

The angles between the plates may be transcribed onto the work and then the relative angular relation of the plates about their long axes may be transposed to the work by transcribing across the end of the plate onto the work.

The tool may also be used as a template, for example, when setting up a saw blade of a radial arm saw to make simultaneously a mitre and bevel cut. To accomplish this, the tool is applied to the flat surfaces to be measured and the plates and angles between them are locked. The tool with its measured angles is then placed on the saw table and the blade is adjusted in both the meter and bevel angles to correspond to the measured angles, hence exactly replicating the measured angle in the next saw cut.

In a preferred embodiment according to the present invention, there is provided a tool for measuring angles between surfaces, comprising first and second measuring sections, each section having a measuring plate extending in a predetermined plane, a hinge element for pivotally securing the sections one to the other and defining a hinge axis for the sections, means pivotally mounting each plate and the hinge element relative to one another enabling each plate for pivotal movement about an axis generally normal to the hinge axis and first means for locking the plate relative to the hinge element in selected angular positions about the normal axis and second means cooperable with the hinge element for locking the sections in selected angular positions about the hinge axis whereby the measuring plates are angularly adjustable about the hinge axis and about axes generally normal to the hinge axis.

In a further preferred embodiment according to the present invention, there is provided a method of measuring angles between angularly related flat surfaces with a tool having a pair of measuring sections pivoted one to the other about a first axis, with each section having a measuring plate pivotable about a second axis normal to the first axis, comprising the steps of abutting the plates against the respective surfaces by (i) pivoting the sections relative to one another about the first axis into angularly adjusted positions relative to one another and (ii) pivoting at least one of the plates into an angularly adjusted position about its second axis to locate the plates flush against the surfaces and locking the sections and the plates in the respective angularly adjusted positions.

Accordingly, it is a primary object of the present invention to provide novel and improved apparatus and methods for measuring multiple angles between flat surfaces in a three-dimensional sense.

BRIEF DESCRIPTION OF THE DRAWING FIGURES

FIG. 6 is a fragmentary exploded perspective view of one of the measuring sections of the tool and its connection with the other measuring section.

DETAILED DESCRIPTION OF THE DRAWING FIGURES

Reference will now be made in detail to a present preferred embodiment of the invention, an example of which is illustrated in the accompanying drawings.

Figure 1:
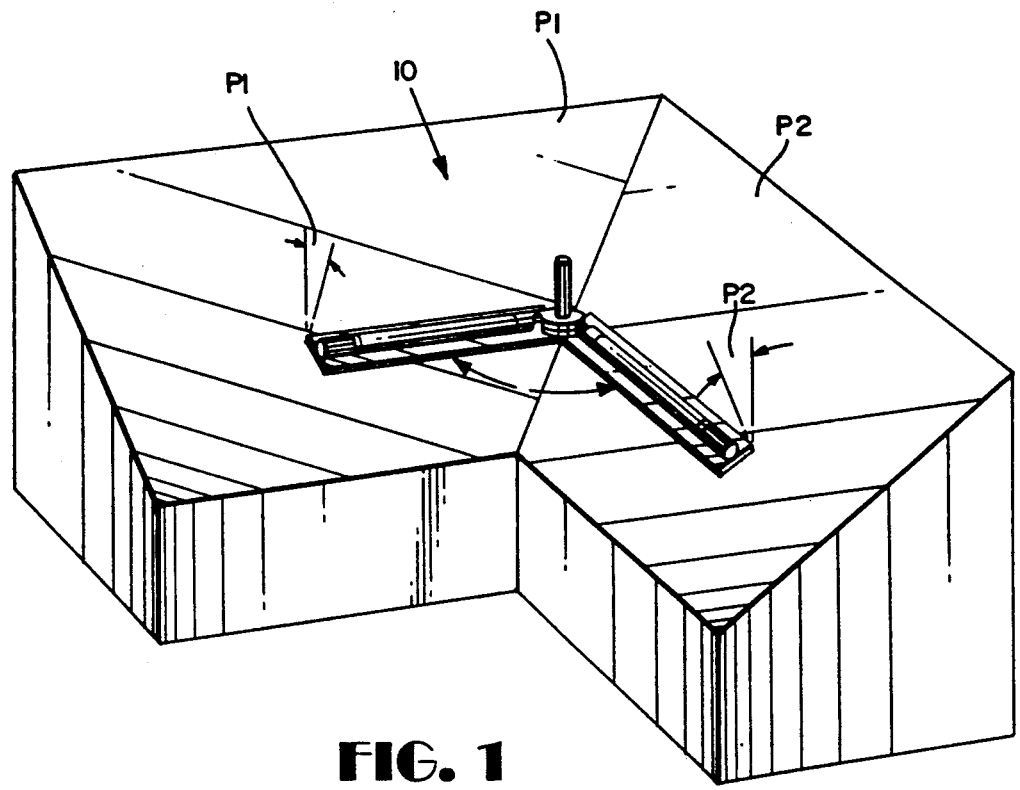
FIG. 1 is a schematic perspective view illustrating a tool constructed in accordance with the present invention applied against a pair of generally flat surfaces forming an angle to be measured.

Referring now to the drawing figures, particularly to FIG. 1, there is illustrated a measuring instrument constructed according to the present invention, generally designated 10, and applied against a pair of angularly related planar surfaces P1 and P2. Note that each of the planar surfaces P1 and P2 forms an angle with the vertical. These angles may be different from or equal to one another.

Figure 2:
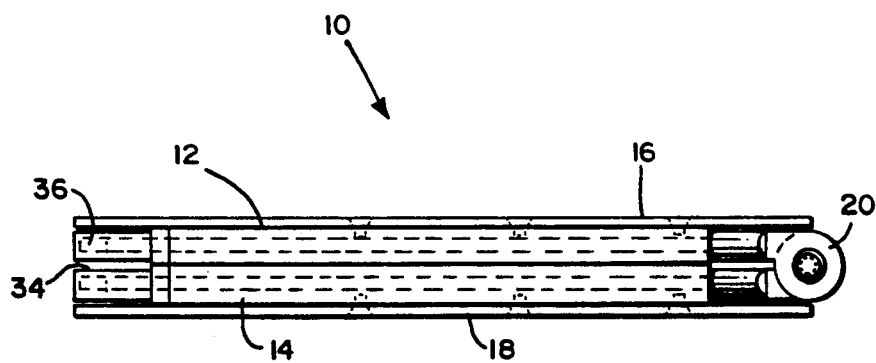
FIG. 2 is a side elevational view of the tool in a folded condition.
Figure 4:
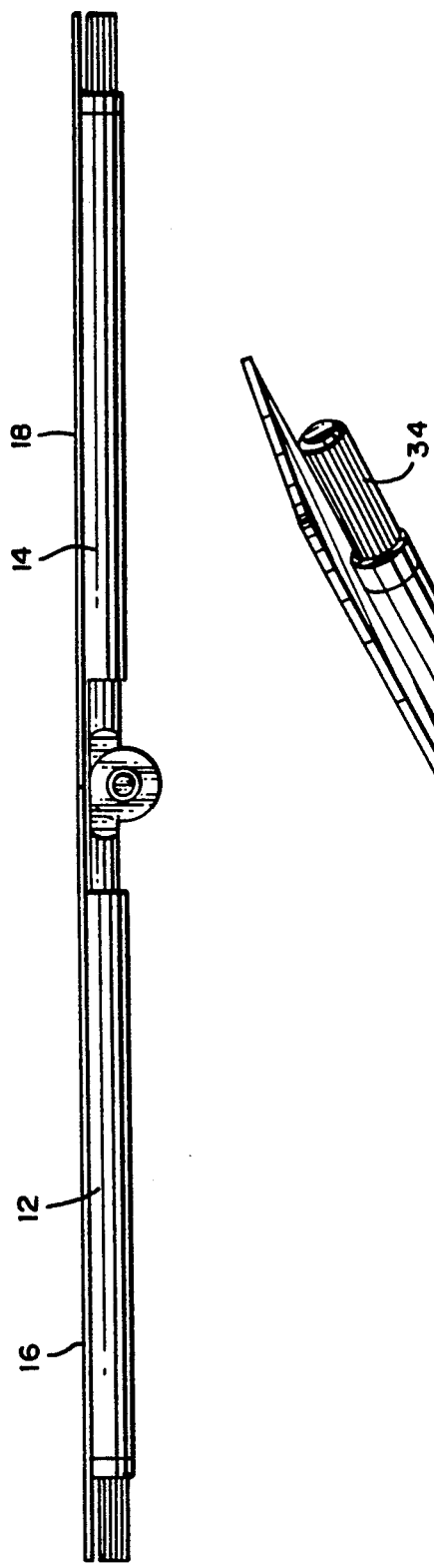
FIG. 4 is a side elevational view of the tool in a fully extended position.
Figure 5:
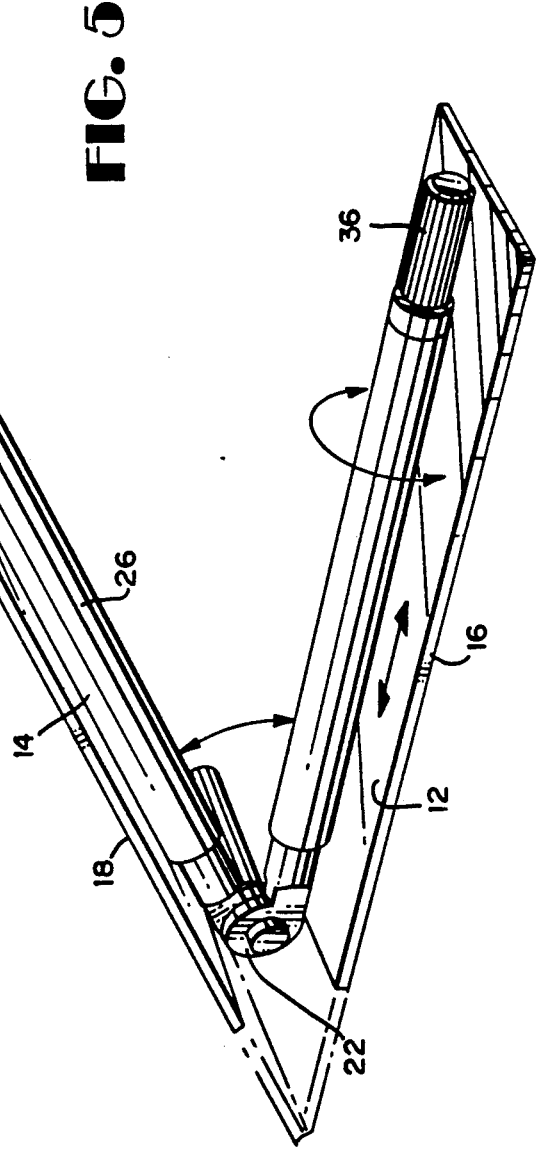
FIG. 5 is a perspective view illustrating the measuring sections of the tool in a predetermined angular relation relative to one another.

Referring to FIGS. 2, 4 and 5, the measuring tool 10 may include a pair of measuring sections 12 and 14, respectively, having flat, linearly extending plates 16 and 18 extending therealong, with each plate having measuring indicia inscribed or otherwise placed along the outer face of the plate. Measuring sections 12 and 14 are hinged one to the other at a corresponding end of each section by mating hinge elements 20 and 22, respectively. Thus, the measuring sections 12 and 14 are pivoted one to the other for pivotal movement about a hinge axis, designated A in FIG. 6.

Means are provided for mounting each plate 16 and 18 for pivotal movement about an axis normal to the hinge axis A. To accomplish this, each measuring section 12 and 14 is provided with an elongated rod 23 and 24, respectively, which projects from the corresponding hinge element 20 and 22, respectively. Sleeves 26 and 28 are received on the rods 23 and 24, respectively, and the sleeves are suitably secured to the measuring plate 16 and 18, for example, by screws 30 passing through and being recessed within slots 32 extending lengthwise along the plates 16 and 18. Thus, it will be appreciated that the plates are securely fixed to the sleeves 26 and 28 and rotate with the sleeves about the rods 23 and 24, respectively. Also, the axes of rotation of the plates about the rods lies coincident with the rods and, hence, normal to the hinge axis A of the measuring tool.

To secure the plates 16 and 18 in selected pivotal or angular positions about their respective axes normal to the hinge axis, the ends of rods 23 and 24 are threaded to receive compression knobs 34 and 36, respectively. A washer 38 may be interposed between the compression knobs and the respective sleeves. It will be appreciated that by threading compression knobs 36 onto the ends of rods 23 and 24, the sleeves 26 and 28 may be frictionally engaged between the compression knobs and the circular ends 40 and 42, respectively, of the hinge elements 20 and 22. Consequently, by loosening the compression knobs 36, the plates may be rotated about rods 23 and 24 into selected angular positions and the compression knobs may then be threaded onto the rods to frictionally hold sleeve 26 and 28 and hence the corresponding plates in the selected angular positions.

The hinge elements 20 and 22 each comprise a generally circular disk having projecting therefrom a generally cylindrical element 40 and 42, respectively, which is offset from the disk. Each disk has a central aperture for receiving a threaded pin 46 coincident with the hinge axis A. A compression knob 48 is threadedly received on the distal end of the threaded pin 46 and a washer 50 is interposed between the compression knob 48 and one of the disk hinge elements. By threading and unthreading the compression knob 48 on the pin 46, the hinge elements are frictionally engaged and disengaged one with the other whereby the measuring sections can be locked in selected angular adjusted positions relative to one another.

Figure 3:
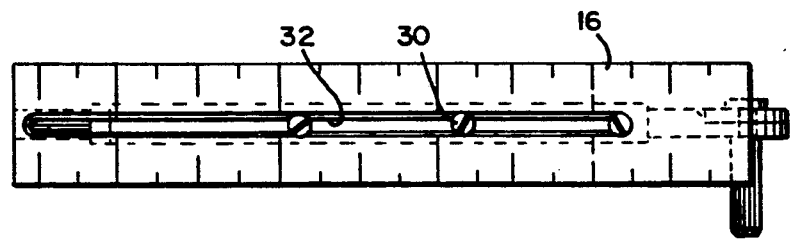
FIG. 3 is a top elevational view thereof.

As will be appreciated from a review of FIGS. 2 and 3, the plates 16 and 18 are also mounted on the sleeves 26 and 28 for linear movement in directions generally parallel to the normal axis of that measuring section. For example, by unthreading the screws 30, the plate 16 may be displaced relative to the sleeve 26 in a direction longitudinally parallel to the normal axis and into the dashed line configuration illustrated in FIG. 5. That is, the plates are slidable along the sleeves in directions generally parallel to the axes of rotation of the sleeves about the rods.

In an alternative form, each plate 16 and 18 may have a smaller secondary plate part slidable relative to and in the plane of the plate. For example, a tongue and groove connection between the plate part of the plate may be provided. The plate part may be locked relative to the plate after displacement thereof toward or away from the hinge axis in a selected linearly adjusted position. To accomplish this, a releasable locking connection between the plate part and sleeve may be provided, for example, similar to the screw and slot arrangement previously described.

To use the measuring device 10 hereof, for example, as a template for transferring an angle between flat planar surfaces such as surfaces P1 and P2 onto a workpiece, the measuring tool is applied to the surfaces to be measured. Thus, the compression knobs 36 and 48 are loosened so that the plates may pivot about the normal axes coincident with rods 23 and 24 and the measuring sections may pivot about the hinge axis A. By placing the tool with the flat plates lying flush against the flat surfaces and locating the hinge axis at the apex of the angle, the measuring instrument takes on the configuration of the angle. By threading the compression knobs, the measuring sections and the plates may be locked in the angular positions indicated by the angle formed by the surfaces P1 and P2. After the measuring instrument is locked, it is removed from those surfaces and placed on the work, where it may form a template for transcribing identical angular related surfaces on the work. The tool may also be used to align a saw blade, for example, a radial arm saw blade, for combined mitre and bevel cuts. The blade is simply aligned with one of the plates while the other plate is placed against a datum surface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool for measuring angles between surfaces, comprising:
   first and second measuring sections;
   each section including a measuring plate having a surface extending in a predetermined plane, a hinge element for pivotally securing said sections one to the other and defining a hinge axis for said sections, means pivotally mounting each plate and said hinge element relative to one another enabling each plate for pivotal movement about an axis generally normal to said hinge axis and generally parallel to the measuring surface plane of said plate, and first means for locking said plate relative to said hinge element in selected angular positions about said normal axis; and
   second means cooperable with said hinge element for locking said sections in selected angular positions about said hinge axis whereby said measuring plates are angularly adjustable about said hinge axis and about axes generally normal to said hinge axis and parallel to the respective planes of said plate.

2. A measuring tool according to claim 1 wherein said hinge elements in part overlap one another, said second means including a locking member engageable with said overlapping hinge element parts to frictionally retain said measuring sections in selected angular adjusted positions about said hinge axis.

3. A measuring tool according to claim 1 wherein said mounting means includes an elongated rod extending generally parallel to said measuring plate, a sleeve overlying and rotatable about said rod and secured to said plate for pivotal movement therewith about said normal axis.

4. A measuring tool according to claim 1 including means mounting at least part of one plate for linear movement in said plane in directions parallel to said normal axis.

5. A measuring tool according to claim 1 including means mounting said plates, when said normal axes lie in non-parallel relation one to the other, for linear movement into abutting relation one with the other.

6. A measuring tool according to claim 5 wherein said pivotal mounting means includes an elongated rod extending generally parallel to said measuring plate and a sleeve overlying and rotatable about said rod and secured to said plate for pivotal movement therewith about said normal axis, and means mounting at least part of one plate and cooperable between said sleeve and said one plate part to enable linear movement of said one plate part relative to said sleeve.

7. A method of measuring angles between angularly related flat surfaces with a tool having a pair of measuring sections pivoted one to the other about a first axis, with each section including a measuring plate having a planar measuring surface pivotable about a second axis normal to said first axis and generally parallel to the plane of said surface, comprising the steps of:
   abutting said plates against the respective surfaces by (i) pivoting said sections relative to one another about said first axis into angularly adjusted positions relative to one another and (ii) pivoting said plates into an angularly adjusted position about said second axes to locate the planar surfaces of said plates flush against said surfaces; and
   locking said sections and said plates in said respective angularly adjusted positions.

8. A method according to claim 7 including pivoting each of said plates into angularly adjusted positions about said second axis, respectively, to locate said plates flush against said surfaces.

9. A method according to claim 7 including sliding at least one of said plates linearly in a direction parallel to the second axis of the measuring section carrying said one plate.

10. A tool for measuring angles between surfaces, comprising:
    first and second measuring sections;
    each section having a measuring plate extending in a predetermined plane, a hinge element for pivotally securing said sections one to the other and defining a hinge axis for said sections, means pivotally mounting each plate and said hinge element relative to one another enabling each plate for pivotal movement about an axis generally normal to said hinge axis and first means for locking said plate relative to said hinge element in selected angular positions about said normal axis; and
    second means cooperable with said hinge element for locking said sections in selected angular positions about said hinge axis whereby said measuring plates are angularly adjustable about said hinge axis and about axes generally normal to said hinge axis;
    said mounting means including an elongated rod extending generally parallel to said measuring plate, a sleeve overlying and rotatable about said rod and secured to said plate for pivotal movement therewith about said normal axis.

11. A measuring tool according to claim 10 wherein said first locking means includes a locking element engageable with said rod and said sleeve for locking said sleeve in selected angular positions about said normal axis.

12. A measuring tool according to claim 11 wherein said locking element is threadedly received about said rod to frictionally engage said sleeve for locking said sleeve in selected angular positions about said normal axis.

13. A tool for measuring angles between surfaces, comprising:
    first and second measuring sections;
    each section having a measuring plate extending in a predetermined plane, a hinge element for pivotally securing said sections one to the other and defining a hinge axis for said sections, means pivotally mounting each plate and said hinge element relative to one another enabling each plate for pivotal movement about an axis generally normal to said hinge axis and first means for locking said plate relative to said hinge element in selected angular positions about said normal axis; and
    second means cooperable with said hinge element for locking said sections in selected angular positions about said hinge axis whereby said measuring plates are angularly adjustable about said hinge axis and about axes generally normal to said hinge axis;

each said plate lying in a plane and including means mounting at least part of said plate for linear movement in said plane in directions parallel to said normal axis.

14. A measuring tool according to claim 13 wherein each said plate, when said normal axes lie in non-parallel relation one to the other, may be moved linearly into abutting relation one with the other.

15. A measuring tool according to claim 14 wherein said mounting means includes an elongated rod extending generally parallel to said measuring plate and a sleeve overlying and rotatable about said rod and secured to said plate for pivotal movement therewith about said normal axis, said plate part mounting means including mean cooperable between said sleeve and said plate part to enable linear movement of said plate part relative to said sleeve.

16. A measuring tool according to claim 15 wherein said first locking means includes a locking element engageable with said rod and said sleeve for locking said sleeve in selected angular positions about said normal axis, said locking element being threadedly received about said rod to frictionally engage said sleeve for locking said sleeve in selected angular positions about said normal axis.

17. A method of measuring angles between angularly related flat surfaces with a tool having a pair of measuring sections pivoted one to the other about a first axis, with each section having a measuring plate pivotable about a second axis normal to said first axis, comprising the steps of:

abutting said plates against the respective surfaces by (i) pivoting said sections relative to one another about said first axis into angularly adjusted positions relative to one another and (ii) pivoting at least one of of said plates into an angularly adjusted position about its second axis to locate said plates flush against said surfaces;

locking said sections and said plates in said respective angularly adjusted positions; and sliding at least one of said plates linearly in a direction parallel to the second axis of the measuring section carrying said one plate.

18. A method according to claim 17 including sliding each said plate linearly in a direction parallel to the second axis of the respective measuring sections.

* * * * *